US008068833B2

(12) United States Patent
Trossen

(10) Patent No.: US 8,068,833 B2
(45) Date of Patent: Nov. 29, 2011

(54) CANDIDATE ACCESS ROUTER DISCOVERY

(75) Inventor: Dirk Trossen, Cambridge, MA (US)

(73) Assignee: Nokia Corporation, Espoo (FI)

( * ) Notice: Subject to any disclaimer, the term of this patent is extended or adjusted under 35 U.S.C. 154(b) by 987 days.

(21) Appl. No.: 10/400,066

(22) Filed: Mar. 27, 2003

(65) Prior Publication Data

US 2003/0227911 A1   Dec. 11, 2003

Related U.S. Application Data

(60) Provisional application No. 60/375,413, filed on Apr. 26, 2002.

(51) Int. Cl.
*H04W 36/00* (2009.01)
(52) U.S. Cl. .................... 455/436; 455/440
(58) Field of Classification Search ................ 455/432.1, 455/436–448
See application file for complete search history.

(56) References Cited

U.S. PATENT DOCUMENTS

| | | | | |
|---|---|---|---|---|
| 5,933,777 A * | 8/1999 | Rahman | ............... | 455/450 |
| 6,515,974 B1 * | 2/2003 | Inoue et al. | ............... | 370/331 |
| 6,647,264 B1 * | 11/2003 | Sasamoto | ............... | 455/445 |
| 6,973,313 B1 * | 12/2005 | Sebastian | ............... | 455/445 |
| 2002/0126633 A1 * | 9/2002 | Mizutani et al. | ............... | 370/329 |
| 2002/0193116 A1 * | 12/2002 | Agrawal et al. | ............... | 455/445 |
| 2003/0033423 A1 * | 2/2003 | Okabe et al. | ............... | 709/232 |
| 2003/0091011 A1 * | 5/2003 | Roberts et al. | ............... | 370/338 |
| 2003/0092444 A1 * | 5/2003 | Sengodan et al. | ............... | 455/436 |
| 2003/0224788 A1 * | 12/2003 | Leung et al. | ............... | 455/435.1 |

FOREIGN PATENT DOCUMENTS

| | | |
|---|---|---|
| EP | 1 189 405 A1 | 3/2002 |
| WO | WO 02/23362 A1 | 3/2002 |
| WO | WO 03/003639 A2 | 1/2003 |

OTHER PUBLICATIONS

Trossen et al.; "A Dynamic Protocol for Candidate Access-Router Discovery", Internet Draft (Mar. 14, 2003); http://www.ietf.org/internet-drafts/draft-trossen-seamoby-dycard-01.txt.
Trossen et al.; "Issues in Candidate Access Router Discovery for Seamless IP-level handoffs", Internet Draft (Oct. 16, 2002); http://www.ietf.org/internet-drafts/draft-ietf-seamoby-cardiscovery-issue-04.txt.

(Continued)

*Primary Examiner* — Lester Kincaid
*Assistant Examiner* — Joel Ajayi
(74) *Attorney, Agent, or Firm* — Alston & Bird LLP

(57) ABSTRACT

An arrangement and a method is provided for discovering candidate access routers in a mobile IP (Internet Protocol) network to enable seamless IP handover of a mobile node between access routers. A server element (19), which is separate from the access routers (11, 12) and the mobile node (MN), is provided with access router information relating to one or more access routers and with information identifying the access router serving the mobile node and reachability information about one or more access routers other than the serving access router that are within reach to the mobile node. The address of at least one of said one or more access routers within reach to the mobile node is determined in the server element on the basis of the provided information.

60 Claims, 3 Drawing Sheets

OTHER PUBLICATIONS

"Issues in Candidate Access Router Discovery for Seamless IP-Level Handoffs", Trossen et al, Work in Progress, IETF Internet Draft, Oct. 2002, http://www.ietf.org/internet-drafts/draft-ietf-seamoby-cardiscovery-issues-04.txt.

"Problem Description: Reasons for Performing Context Transfers Between Nodes in an IP Access Network", J. Kempf, Network Working Group, Sep. 2002, pp. 1-12, ftp://ftp.rfc-editor.org/in-notes/rfc3374.txt.

"Geographically Adjacent Access Router Discovery Protocol", Funato et al, Seamoby Working Group, Internet Draft, Dec. 2002, pp. 1-16, http://www.ietf.org/internet-drafts/draft-funato-seamoby-gaard-01.txt.

"A Dynamic Protocol for Candidate Access-Router Discovery", Trossen et al, Seamoby Working Group, Internet Draft, Oct. 25, 2002, pp. 1-44, http://www.ietf.org/internet-drafts/draft-trossen-seamoby-dycard-00.txt.

Search Report for PCT/FI03/00319 dated Jul. 25, 2003.

* cited by examiner

CANDIDATE ACCESS ROUTER DISCOVERY

REFERENCE TO RELATED APPLICATIONS

This application claims priority of U.S. Provisional Patent Application Serial No. 60/375,413, filed on Apr. 26, 2002, the contents of which are hereby incorporated by reference.

FIELD OF THE INVENTION

The invention relates to mobile telecommunication networks, and more particularly to discovering candidate access routers in a mobile IP (Internet Protocol) network to enable seamless IP handover of a mobile node between access routers.

BACKGROUND OF THE INVENTION

One of the targets in the development of telecommunication networks is to provide the user with an IP service, i.e. access to the Internet through an access network. The basic IP concept does not support the mobility of the user, and therefore, a mobile IP protocol has been introduced by the Internet Engineering Task Force (IETF) in order to enhance the mobility in the Internet. Mobile IP enables routing of IP datagrams to mobile nodes independently of the point of attachment in the sub-network. In the basic IP, the IP addresses are assigned to network interfaces in dependence on their physical location, which prevents the user (the mobile node) from keeping its address while moving over different Internet sub-nets, i.e. while changing the physical interface.

Mobile node (MN) refers to an IP node that is capable of changing its point of attachment from one network or sub-network to another. A mobile node may change its location without changing its IP address; it may continue to communicate with other Internet nodes at any location using its (permanent) IP address. When a mobile node visits a foreign network, a care-of-address (C/O-address) is temporarily assigned to the mobile node. The IP datagrams addressed to the mobile node are forwarded to this care-of-address.

A critical issue for the success of next generation mobile networks is the ability of seamless IP-layer mobility. Seamless mobility is the ability to hand a mobile node (MN) over from one (old) access router (AR) to another (new) access router with minimal service disruption. An access router refers to an access network router residing on the edge of an access network and connected to one or more access points (AP), i.e. base stations. The access points may be of different technology. An access router offers IP connectivity to mobile nodes, acting as a default router to the mobile nodes it is currently serving.

Discovering neighboring access routers within the access router's proximity is considered an important part of the ability of providing seamless handovers in IP based mobile networks. Mechanisms for realizing protocols to discover neighboring access routers and their capabilities to facilitate seamless handovers have been proposed in e.g. [1] D. Trossen et al., "A Dynamic Protocol for Candidate Access Router Discovery", Work In Progress, IETF Internet Draft, October 2002, and D. Funato et al., "Geographically Adjacent Access Router Discovery Protocol", Work In Progress, IETF Internet Draft, December 2002.

The selection of the target access router (TAR), i.e. the access router to which the mobile node is eventually handed over, is not defined in the context of candidate access router (CAR) discovery, albeit it is the subsequent action to any CAR discovery solution. However, this step is not within the scope of CAR discovery, as outlined in D. Trossen et al., "Issues in Candidate Access Router Discovery for Seamless IP-level Handoffs", Work In Progress, IETF Internet Draft, October 2002.

According to prior art solutions, candidate access router discovery protocols are realized either in the access routers or in the mobile nodes or in both. A possible problem relating to prior art solutions is that access routers may belong to different network operators and, thus, operators have to reveal various confidential information, e.g. capability information, to other operators. Furthermore, when the logic controlling the candidate access router discovery has to be updated, it must be performed in each access router separately. On the other hand, if the candidate access router discovery protocols are realized solely in the mobile nodes, this might lead to an excessive data exchange over the wireless link.

BRIEF DESCRIPTION OF THE INVENTION

An object of the present invention is thus to provide a method and an apparatus for implementing the method so as to overcome the above problems or to alleviate the above disadvantages or at least to provide an alternative solution.

The invention is based on the idea of provisioning of candidate access router discovery functionality in an external server element, e.g. an application server (AS). Hence, the functionality is neither implemented in the mobile node nor in the access router, even though they may have a supporting role in the candidate access router discovery procedure.

According to one aspect of the invention, there is provided a method of discovering candidate access routers in a mobile IP (Internet Protocol) network to enable seamless IP handover of a mobile node between access routers, the method comprising: providing a server element, which is separate from the access routers and the mobile node, with access router information relating to one or more access routers; providing the server element with information identifying the access router serving the mobile node and reachability information about one or more access routers other than the serving access router that are within reach to the mobile node; and determining, in the server element on the basis of the provided information, address of at least one of said one or more access routers within reach to the mobile node.

According to another aspect of the invention, there is provided an arrangement in a mobile IP (Internet Protocol) network comprising: a mobile node, a plurality of access routers providing access for mobile nodes to an IP network, and a server element, which is separate from the access routers and the mobile node, comprising access router information relating to one or more access routers; wherein the arrangement is configured to provide the server element with information identifying the access router serving the mobile node and reachability information about one or more access routers other than the serving access router that are within reach to the mobile node, and the server element is configured to determine, on the basis of the provided information, address of at least one of said one or more access routers within reach to the mobile node.

According to yet another aspect of the invention, there is provided a server element in a mobile IP (Internet Protocol) network comprising a mobile node and a plurality of access routers providing access for mobile nodes to an IP network, wherein the server element is separate from the access routers and the mobile node, and wherein the server element is configured to receive access router information relating to one or more access routers; receive information identifying the access router serving the mobile node and reachability information about one or more access routers other than the serving access router that are within reach to the mobile node, and determine, on the basis of the provided information, address of at least one of said one or more access routers within reach to the mobile node.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

The present invention can be applied to any mobile communication system providing packet data services for mobile nodes within a defined service area, and it can be embodied in various forms.

Figure 1:
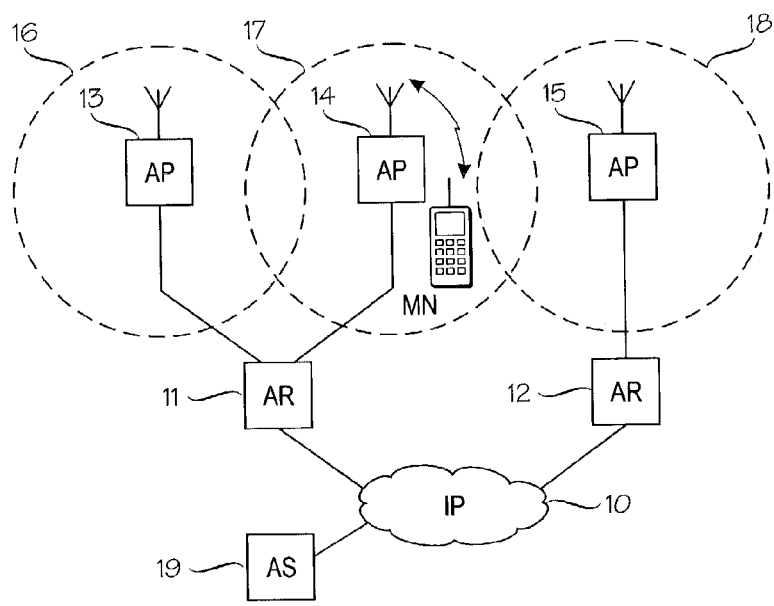
FIG. 1 is a simplified block diagram of a mobile IP telecommunication system according to an embodiment of the invention.

FIG. 1 shows a simplified block diagram of a mobile IP telecommunication system according to an embodiment of the invention illustrating only basic elements of the system. It is obvious to a person skilled in the art that the system shown in FIG. 1 typically comprises numerous other elements, which are not described in greater detail herein.

The mobile communication system of FIG. 1 comprises a mobile node MN in its current cell 17 of a current access point 14. The mobile node MN is an IP node that is capable of changing its point of attachment to the network. The access point 14 is a device that provides an access link to the mobile node MN, typically a link layer (layer 2, L2) device with a radio transceiver (e.g. a base station). The cell 17 consists of a geographical area within which wireless communication between the access point 14 and the mobile node MN is possible. An access router 11 acts as an IP router for the access point 14 connecting it to an IP network 10, such as the Internet. One access router may be connected to one or more access points and one access network may comprise one or more access routers. An access point may be a separate physical entity or co-located with an access router. The mobile node MN is registered in cell 17 but can move to the coverage area of either cell 16 or cell 18 and start communicating with access point 13 or 15 correspondingly. In FIG. 1 the serving access router 11 is connected to the current access point 14 and to a second access point 13. FIG. 1 also shows another access router 12 connected to the access point 15. In accordance with the present invention, the system of FIG. 1 comprises a separate server element 19, e.g. an application server (AS) or a corresponding network element. In the following description the term application server should be understood broadly to refer to any network element performing the function described. The server element 19 can be implemented as a computer unit having suitable software therein. The server element 19 is preferably connected to the system via the IP network 10 as shown.

Figure 2:
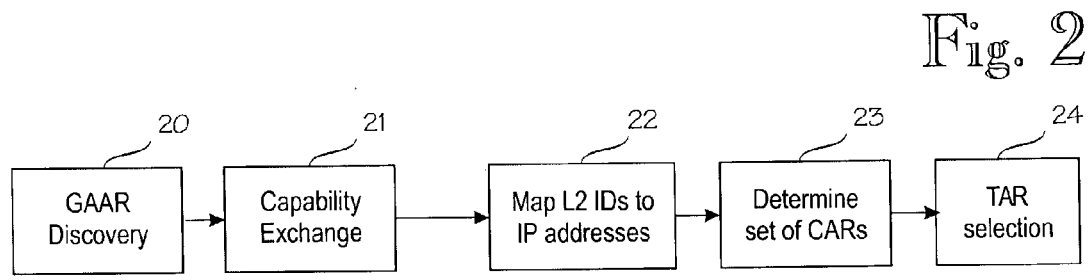
FIG. 2 is a flow diagram illustrating the candidate access router discovery protocol according to an embodiment.

FIG. 2 shows a flow diagram outlining the different phases to be performed by the CAR discovery protocol according to the present plans by the Internet Engineering Task Force. It should be noted that the future final solution to be implemented may be different from the one shown in FIG. 2 without this having any relevance to the basic idea of the present invention.

The CAR discovery shown in FIG. 2 starts with step 20, in which geographically adjacent access routers (GAAR) are discovered, and step 21, in which the capabilities of the geographically adjacent access routers are determined. The information determined in steps 20 and 21 together can also be referred to as physical neighborhood information or access router information. Steps 20 and 21 take place prior to a handover of the mobile node from one access router to another. In the following step 22, layer 2 identifiers obtained by the mobile node are mapped to corresponding IP addresses and by the mobile node are mapped to corresponding IP addresses and in step 23 a set of candidate access routers is determined. Step 24, namely the target access router selection, is also shown although it is not within the scope of the actual CAR discovery, as mentioned earlier. The CAR discovery procedure is explained in greater detail in the following in connection with preferred embodiments of the invention.

According to an embodiment of the present invention, steps 20 to 23 (or corresponding procedure) or at least some of them are performed in a separate server element. Preferably they are performed within an application server 19, which is located outside the network operator's realm. Thanks to this, the entire logic of CAR discovery will not reside inside any operator boundaries even though agreements between a service provider and operators are still necessary for exchanging the appropriate information. This embodiment of the invention allows for inter-operator scenarios but also for different aspects of trust relationships (only between user and one service provider rather than between different operators).

As to the provisioning of access router information (neighborhood information) to the application server 19, several alternative modes of implementation are possible. This information preferably comprises AR identifiers together with the identifiers of the access points that the access router serves. This information is used to perform the L2 to IP identifier mapping. The format of the L2 identifiers depends on the specific link layer techniques used and has no relevance to the basic idea of the invention. Furthermore, the information preferably comprises information about which other access routers are geographically adjacent, i.e. with which access points of other access routers does the access router have an overlapping coverage area. This information is used to determine the candidate access routers, i.e. the access routers that are potential candidates for handover at the time of the actual handover.

Additionally, each piece of AR/AP information can be supplemented with capability information. This information can include capabilities of the AR/APs or other details (see e.g. [1]). Examples of capability information include bandwidths supported by the access router, dynamic loading conditions, security schemes, quality of service (QoS) capabilities, file formats, streaming media support, transmission technology, power levels, estimated signal range, service facilities, cost information, promotional information, advertising information etc. This information is only required if the application server AS assists in the CAR determination process. If the CAR determination is entirely performed in the mobile node MN, this information is not required. There are several possibilities of obtaining this information: according to one embodiment, the capability information is initially provided through the operator for each access router within the operator domain. According to another embodiment, the capability information is dynamically obtained by the application server AS through directly querying the access router for this information. In this case, the application server AS might contact the previous access router ($AR_1$ in FIG. 3) for its capabilities. For this, a proper security association and trust relationship is assumed to exist between the operator and the application server AS. As one embodiment, a shared secret (shared between operator and the application server AS) might be used to identify the application server AS towards the access router, which in turn responds with the current set of capabilities. These capabilities are then stored appropriately in the application server's internal database as supplementary information to $AR_1$. It is further possible that after the initial request, either the application server AS requests the capabilities in the future to refresh them (poll) or the access router sends the capabilities to the application server AS upon changes of the capabilities (push). According to yet another embodiment, at some time prior to the actual handover to a new point of attachment (at least the address of the new access router has to be available), the mobile node provides the application server with a handover trigger, containing the address of the new access router (or routers if several alternatives exist) and a list of capabilities of the new access router. If the mobile node is not aware of the capabilities of the new access router, it is also possible that the application server queries the new access router for the capability information upon receiving the handover trigger containing the address of the new access router.

Different implementation modes can be used with respect to the provisioning of the abovementioned AR/AP identifiers and geographical information in the application server AS.

According to one embodiment, provisioning of access router information (e.g. AR/AP identifiers, and the geographical information of each AR/AP) takes place through the network operator(s). For that, information that is required to be present in the application server AS is the mapping information of link layer identifiers, referred to as L2ID in the following, to IP addresses of the access router serving those link layer devices. Further, geographical information is required to be provided by the operator(s) to determine which of those access routers and access points are geographically adjacent. This information is preferably provided to the application server by the operators through service level agreements. However, this requires that the AP/AR locations are well known to the operators, including the coverage areas. This is likely to be the case for engineered networks. Further, capability information, either statically or dynamically (depending upon the nature of the capability information), could be provided to the service provider by the operators. However, this depends on whether or not capability information is retrieved through the application server AS or directly via the mobile node MN. The provisioning of the information can be performed at startup of the service within the application server AS, or it can be refreshed upon changes in the operator's network. The geographical information is preferably comprised of location and coverage area information of each AR/AP. This information is used to determine overlapping coverage areas. However, this requires that the AP/AR locations are well known to the operators, including the coverage areas. This is likely to be the case for engineered networks. However, for many cases, this kind of information is either not available or highly inaccurate, for instance for WLAN hotspot areas.

Figure 3:
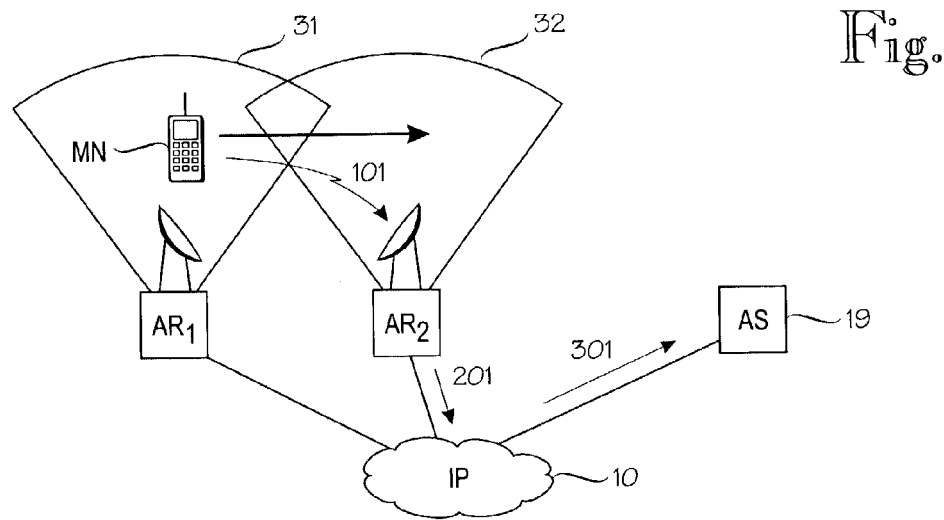
FIG. 3 is a block diagram of a mobile IP telecommunication system according to an embodiment of the invention.

According to another embodiment, provisioning of access router information does not require the operator to provide the exact AR/AP identifier information together with the geographical location information, and is therefore better suited for environments in which such information is not likely to be present, such as in WLAN hotspots. According to this embodiment, the AR/AP information is gathered through a learning mechanism described in more detail below. Hence, the mobile node MN sends the current and previous AR/AP identifier to the application server AS after a handover has occurred. With that information, the application server AS can determine that both access routers have overlapping coverage areas and are therefore geographically adjacent. Further, the application server preferably stores the AR/AP information for further mappings from L2 to IP for this particular access point. Referring to FIG. 3, once the mobile node MN, connected to $AR_1$, moves from the coverage area 31 of $AR_1$ into the coverage area 32 of $AR_2$, the mobile node MN sends (messages 101, 201, 301) the IP address of its previous access router, i.e. $AR_1$, to the application server AS after the mobile node MN obtained connectivity with $AR_2$, i.e. via the newly obtained connectivity with $AR_2$. The information further contains the L2 identifier of the access point to which the mobile node MN was connected, i.e. which was served by $AR_1$, and the IP address of $AR_2$. This information, i.e. $AR_1$'s IP address and the access point's L2 identifier, is added to application server's database information. If there exists capability information for this access router, provided through the operator as described above, the AR/AP information is appropriately added to this capability information. Further, the information of $AR_2$ is used to determine that $AR_1$ and $AR_2$ are geographically adjacent, i.e. that they have overlapping coverage areas. This inferred information is appropriately added to the database entry of $AR_1$. Hence, the application server AS dynamically obtains information about access router IP addresses together with the L2 identifiers of the access point that the access router is serving and IP addresses of adjacent access routers. This information is supplemented (if required) by the operator-provided capability information. According to this embodiment, the access router's IP address has to be present at the mobile node MN. Without this information, the mobile node MN will not be able to send out packets. The protocol, therefore, uses information (router's IP address) existing in the mobile node MN as the main information transferred in the protocol. In other words, the protocol does not assume additional capabilities to be present at the mobile node MN that are unique to the invention rather than re-uses information that is present in the mobile node MN anyway.

Assuming that the AR/AP information, together with capability information, is present in the application server AS, provided through any of the above-mentioned embodiments, the CAR discovery preferably continues as follows.

Figure 4:
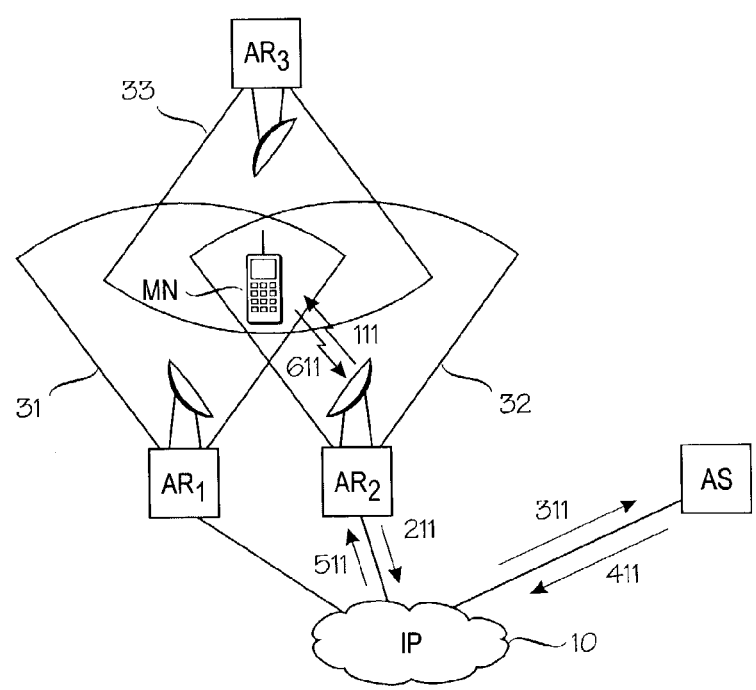
FIG. 4 is a block diagram of a mobile IP telecommunication system according to an embodiment of the invention.

Once the mobile node MN is moving from a service area of one access router to the service area of another access router, as shown e.g. in FIG. 3, and obtains reachability information about the other (one or several) AR/AP that is within reach to the mobile node, usually through receiving a link layer identifier within an access point L2 beacon that is served by the another (new) access router, the mobile node MN sends this reachability information to the application server AS together with the IP address of the currently serving access router. Note that the mobile node MN might also choose to provide a whole list of L2 identifiers (e.g. through collecting reachability information over a time window period). Upon reception of this list of L2 identifiers, the application server AS uses the neighborhood information to map the L2 identifiers to the appropriate IP addresses of the serving access router. In other words, the mobile node MN detects the presence of certain access points, e.g. through receiving link layer information (beacon) from the new access point (in FIG. 4, the beacons of the access points (not shown) served by $AR_1$ and $AR_3$ are received by the mobile node MN, i.e. access routers $AR_1$ and $AR_3$ are within reach to the mobile node in addition to the serving access router $AR_2$). It is assumed that this information contains the L2 identifier of the access point. It is further assumed that the beacon does not contain the IP address of the access router that serves this access point. Note that there could be multiple access points that the mobile node MN could listen to (possibly over different radio interfaces) as shown in the example of FIG. 4 showing the corresponding coverage areas 31, 32 and 33 of the access routers $AR_1$, $AR_2$ and $AR_3$. The mobile node MN now sends a message to the application server AS (messages 111, 211 and 311 in FIG. 4) that contains the L2 identifier of the access point. Note that the message might also contain a list of L2 identifiers in case that the mobile node MN received several beacons, as in the example of FIG. 4. The message further includes the IP address of the access router that currently serves the mobile node MN, e.g. $AR_2$ in the example of FIG. 4. Upon reception of the message, the application server AS uses its internal database to map the L2 identifier(s) onto the IP address(es) of the access router(s) that serves the particular access point(s). The information stored in the application server's database allows for such kind of mapping due to the geographical adjacency information (e.g. either the geographical position/ coverage information or the learned adjacency information). The application server AS compiles a list of IP addresses that corresponds to the list of provided L2 identifiers and sends this information back to the mobile node MN (messages 411, 511 and 611 in FIG. 4). With this, the mobile node MN obtains knowledge of the IP addresses of the access routers that serve the access points from which it received the beacons.

For the implementation of the actual CAR determination, different modes for implementation are possible as well. According to an embodiment, the CAR determination is entirely performed in the mobile node MN, whereby the result of the L2 to IP mapping is directly sent back to the mobile node MN, which then in turn uses the address information for further purposes, e.g., requesting the capability information directly from the access router and performing the selection of an appropriate TAR. According to another embodiment, the capabilities of the access routers, which are mapped as described above, are included in the message 411 of FIG. 4, i.e. in the response message of the application server. According to another embodiment, the mobile node MN provides the application server AS with its requirements prior to (or together with) the mapping request, the list of CARs is determined within the application server AS through mapping of requirements onto capabilities (if available in the AS). The list of CARs is then eventually provided back to the mobile node MN. According to yet another embodiment, the capabilities of interest are provided back to the mobile node MN rather than revealing the requirements to the application server AS. In this case, the capabilities of interest have been provided to the application server AS from the mobile node MN before the mapping was requested. This information is then used upon reception of message 311 in FIG. 4 within the application server AS to be matched against the capabilities of each access router which serves at least one of the access points the MN heard. The application server AS then sends the mapped IP address back to the mobile node together with the capabilities of interest that were found. The implementation of the transfer of mobile node's capabilities of interest or mobile node's requirements from the serving access router to the new access router has no relevance to the basic idea of the invention. However, e.g. techniques presented in Kempf et al., "Problem Description: Reasons For Performing Context Transfers Between Nodes in an IP Access Network", IETF RFC (Request For Comments) 3374, September 2002, are suitable for this. For the last of above-mentioned embodiments relating to the capability handling, the final TAR selection can also be realized in the application server. For that, a policy is preferably specified how to determine a final candidate out of the set of possibly several CARs that is determined through matching the mobile node's requirements with the access router's capabilities. How this policy is implemented and specified has no relevance to the basic idea of the invention.

The specific format of the messages used in the various embodiments of the invention has no relevance to the basic idea of the invention. However, the usage of ICMP (Internet Control Message Protocol) messages or options together with TLV (type/length/value) or XML (extensible markup language) formatted content can be used, for example. Furthermore, the functionality within the application server can be implemented entirely on application level.

In the embodiments of the invention described above, the mobile node MN has assisted the application server in the candidate access router discovery. It is, however, also possible that the access router assists the application server. This embodiment of the invention is described in more detail in the following.

According to an embodiment of the invention, the application server is known to each access router prior to performing the CAR discovery in the sense that the IP address and appropriate port information is known prior to the CAR discovery. Although each access router preferably has a unique server to be used for CAR discovery, it is feasible to introduce several servers within a domain, e.g. for load sharing. It is further assumed that appropriate security associations are present. Further, it is assumed that the application server maintains a Physical Neighborhood List (PNL) for each access router it serves (see e.g. [1] for possible implementation alternatives). The PNL preferably contains GAAR's IP addresses, the L2 identifiers, the capabilities for each GAAR, and an associated lifetime. In addition to this, the PNL has associated access router IP address, access router's L2 devices, and access router capabilities. It is not relevant to the basic idea of the invention how the access router's information has been obtained. A simple push to the server at startup of each access router or manual configuration are examples of possible ways for implementation.

Figure 5:
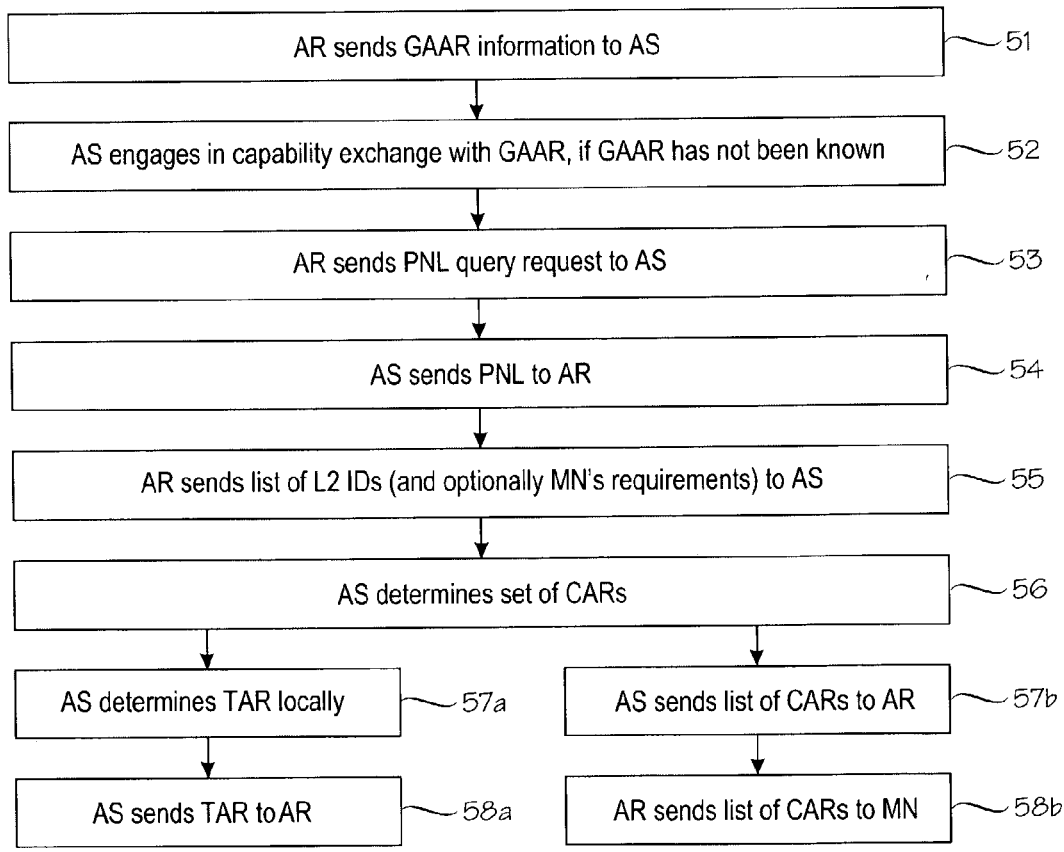
FIG. 5 is a flow diagram illustrating embodiments of the invention.

Referring to FIG. 5, in step 51, the access router sends GAAR information, i.e. the GAAR's IP address, to the application server. It has no relevance to the present invention how the GAAR information is obtained at the AR. However, mechanisms such as proposed in [1] can be used, for example. In addition, the access router can implement a cache containing the recently signalled GAAR identifiers. With this cache, the signalling to the application server is minimized, i.e. only new GAARs are signalled. If the GAAR has not yet been in the access router's PNL (stored in the application server), the server engages in a capability exchange with the GAAR in step 52 by sending a capability exchange message to the GAAR. The exact protocol used has no relevance to the basic idea of the present invention (possible implementation alternatives are disclosed in [1] ). With these two steps, the application server eventually obtains knowledge of the physical proximity (stored in the PNL) of each access router it serves. The access router may request this information in step 53 by sending a PNL query request to the application server, which in turn sends the particular PNL back to the access router (step 54). The exact format of these messages has no relevance to the basic idea of the present invention. At the time of the mobile node's handover, the access router sends the list of L2 identifiers of GAARs that have been detected by the mobile node MN to the application server in step 55. Optionally, the mobile node's requirements for the TAR selection might be contained in this message as well. How the L2 identifiers are obtained has no relevance to the basic idea of the invention but again possible implementation alternatives are disclosed in [1]. The exact format of this message has no relevance to the basic idea of the present invention, either. In step 56, the application server maps the L2 identifiers to the appropriate IP addresses and determines the set of CARs for which it might use mobile node's requirements or some other criteria.

Two different embodiments can be distinguished after the completion of step 56. Either the TAR selection is implemented entirely within the application server (steps 57*a* and 58*a*) or within the mobile node (steps 57*b* and 58*b*). According to the first embodiment, the application server selects the TAR out of the set of CARs (step 57*a*), on the basis of e.g. some local selection algorithm. The identifier of the selected TAR is sent in step 58*a* to the access router. According to the second embodiment, the application server sends the list of CARs to the access router (step 57*b*), which in turn forwards this list to the mobile node (step 58*b*). The format of both messages has no relevance to the basic idea of the present invention.

Since the PNL within the application server comprises a distributed set of information, a maintenance and update mechanism is preferably realized to avoid or at least minimize inconsistencies of the set of data. For that, appropriate REFRESH and UPDATE messages can be implemented. The messages (REFRESH and UPDATE) are accordingly sent or forwarded to the application server. In a first embodiment, rather than sending the messages from the access router to its GAARs, the message is sent to the application server, which in turn forwards them to all GAARs of this access router. In a second embodiment, upon reception of messages at the access router, the message is forwarded to the application server, which appropriately updates and maintains the PNL of the particular access router.

The different embodiments of the invention described above potentially provide various advantages, which are briefly outlined below. The present invention allows for implementing the entire CAR discovery functionality outside of the network operator(s) realm(s). If the capability provisioning is implemented in the mobile node, there is no information required from the operator. This allows for a $3^{rd}$ party service provider approach for this kind of network functionality. Such a $3^{rd}$ party approach is attractive for several reasons. The operators do not need to reveal information to other operators (since the entire logic resides in the application server which has a service level agreement with the operator, including the confidentiality aspect of the access router information). This secures the capability information exchange. If the CAR determination is implemented in the application server, the operators do not need to reveal information to the MN. Updating any kind of logic, in particular selection logic for CAR determination, does not necessarily (depending on the embodiment used for the implementation) require changes in network elements. The invention allows for several service providers, each of which could either serve different domains or could differentiate by the provided capability information. The present invention can also reduce the information that is exchanged via the wireless link.

As discussed already above, an ability of seamless service provisioning to mobile users is an important issue and the ability to handover a mobile node (MN) to a new access router (AR) with minimal disruption of IP connectivity is preferable. However, a service typically consists of more than mere IP-layer connectivity. The fact that a mobile node is able to exchange IP packets with the network does not necessarily mean that it can use a particular service. Hence, service disruption might still occur if the service-specific functionality is not relocated as the mobile node changes its point of attachment to the Internet. An embodiment of the invention described in detail below thus provides additional methods in order to provide seamless service to mobile users. It should be noted that the following embodiment and variations thereof can be combined with any of the embodiments of the invention described above.

According to an embodiment of the invention, application context information of the mobile node is registered with the application server prior to changing the serving access router of the mobile node and, during the handover of the mobile node, the context information is used in the application server to invoke application specific actions. In other words, application context information is registered with the application server. The actual format of the specific application context information has no relevance to the basic idea of the invention. Next the application server is preferably provided with an identifier (e.g. an L2 identifier or an IP address if known) of the new access router to which the mobile node will connect at some point of time. After that the application server is preferably provided with capability information of the new AR e.g. as described already earlier. This will lay ground for the appropriate handling of the service functionality relocation. Finally, the application server extracts the relevant information from the registered application context information and the obtained capability information for the new AR realm and invokes appropriate actions, which are specific for the application, i.e. they are a matter of local implementation policy and thus have no relevance to the invention. This embodiment of the invention can be applied to various problems, e.g. transcoder relocation, security gateway relocation, location server relocation. It provides for seamless service provisioning without the necessity of a proper deployment in each access router. The central provisioning of seamless service provisioning also allows for faster upgrade of functionality compared to the upgrade within each access router. It also allows for a certain degree of freedom in implementing certain seamless provisioning functionality, enabling differentiation of the service provider without opening interoperability problems.

Further, this embodiment of the invention enables a service provider-driven approach to the problem of seamless service provisioning, i.e. dedicated service providers can be established that provide seamless continuation of certain services, hence enabling competition for this kind of functionality outside of the operator's domain. It also makes it possible to reduce the complexity of the mobile node since the relocation functionality is not required to be implemented at the mobile node. Since this functionality differentiates for each possible application, the invention drastically reduces the mobile node's complexity by outsourcing this functionality to the application server. Examples of the implementation of this embodiment of the invention are given in the following.

Figure 6:
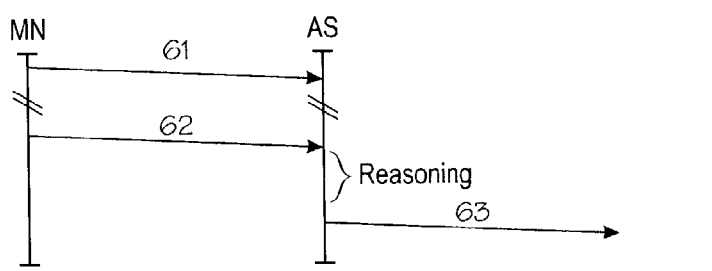
FIGS. 6, 7, 8 and 9 are signalling diagrams illustrating embodiments of the invention.

FIG. 6 shows the message sequence chart according to one embodiment, in which the mobile node is aware of the capabilities of the new access router. In message 61 in FIG. 6, the mobile node registers application context information with the application server. The application context information is stored within the application server for further usage. Examples for application context, among others, are media information, required resources (e.g. bandwidth), required service functionality (e.g. location information). At some time prior to the actual handoff to a new point of attachment, the mobile node provides the application server with a handoff trigger (message 62), containing an identifier identifying the new access router and a list of capabilities of the new access router (the MN is aware of these capabilities). Based on the obtained information at handoff, i.e. new access router's identifier (from which the application server can derive the address of the access router, as described earlier in this application, if the identifier is not an address but e.g. an L2 identifier) and capabilities, and the registered application context of the mobile node, the application server takes appropriate actions (message 63). It should be noted that message 63 might consist of a sequence of messages, depending on the actual embodiment of the invention, i.e. actual service functionality that is relocated. The reasoning part in FIG. 6 determines the actions to be taken.

Figure 7:
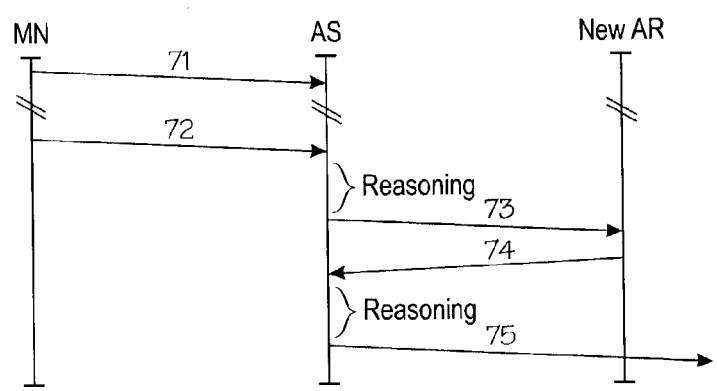

FIG. 7 shows the message sequence chart according to another embodiment, in which the mobile node is not aware of the capabilities of the new access router. In message 71 in FIG. 7, the mobile node registers application context information with the application server. The handoff event delivery (message 72) lacks the capability information since the mobile node is not aware of this information. The reasoning part, following message 72, determines the capability information that is required for the further actions. Messages 73 and 74 in FIG. 7 query the new access router for this capability information. Based on the obtained information, i.e. new access router's address and capabilities, and the registered application context of the mobile node, the application server takes appropriate actions (message 75 in FIG. 7). It should be noted that message 75 might consist of a sequence of messages, depending on the actual embodiment of the invention, i.e. the actual service functionality that is relocated. The second reasoning part in FIG. 7 determines the actions to be taken.

The exact format of presented messages as well as the application context format has no relevance to the basic idea of the invention. For example, appropriate ICMP or UDP (User Datagram Protocol) messages can be used.

Figure 8:
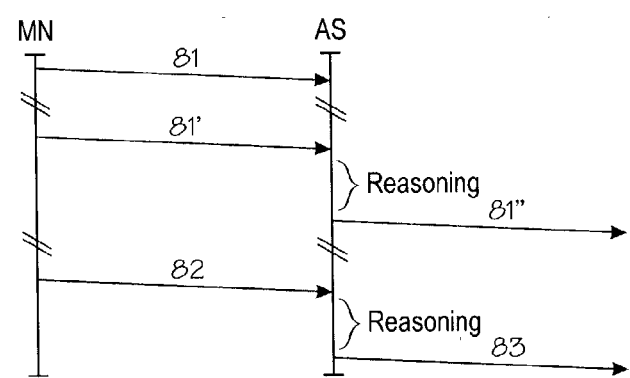
Figure 9:
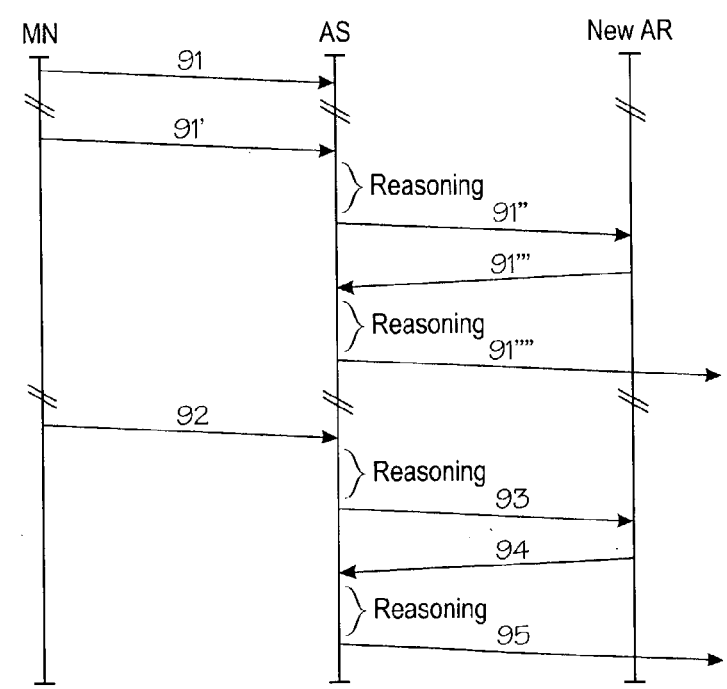

According to one embodiment of the invention, a pro-active allocation or relocation of application-specific resources can be provided. This is preferably implemented through marking application context information that is supposed to be allocated proactively during registration of the context (message 81 in FIG. 8). The actions taken are then appropriately divided into pro-active and commitment actions. The mobile node delivers the identifier of the new access router to the application server prior to the actual handoff (shown in FIG. 8 as message 81'). The application server implements the pro-active actions (message 81" in FIG. 8) prior to the actual handoff. At the time of handoff, message 82 and subsequent messages are implemented similar to the non-proactive embodiment described above, implementing the commitment actions to be taken. According to another embodiment of the invention, shown in FIG. 9, the capabilities of the new access router are obtained (i.e. messages 91" and 91'" in FIG. 9) after receiving message 91' (corresponding to message 81') and taking the pro-active actions in message 91"" of FIG. 9. Messages 91, 92, 93, 94 and 95 correspond to messages 71, 72, 73, 74 and 75, respectively.

These embodiments of the invention can be applied to solving various problems, such as transcoder relocation, security gateway relocation, location server relocation, or web proxy redirection. These kind of implementations are considered obvious to a person skilled in the art. However, as one possible example, a location server embodiment is outlined in the following. The mobile node registers the need of a location server for supplementary information to the provided service with the application server (message 71 in FIG. 7). Upon handoff, the mobile node sends the identifier of the new access router to the application server (message 72 in FIG. 7). If the domain of the application router has changed compared to the previous one (checked in the first reasoning part, e.g. based on the IP subnet information), the capabilities of the new access router are requested to obtain a location server address (messages 73 and 74 in FIG. 7). If there is no location server information available at the new access router, the application server discovers the location server in the new domain (e.g. through using SLP), and takes appropriate actions for the continuation of the session (message 75 in FIG. 7), e.g. providing the location server address to the mobile node and core network. It should be noted that the situation according to FIG. 6 can be realized through omitting the capability request (messages 73 and 74) and either issuing the discovery of the location server directly or obtaining the location server address through the new access router's capabilities (delivered through message 62 in FIG. 6).

An appropriate handling of the application context information is preferable in the application server. If the application server needs to contact other network elements for setting up the appropriate service environment for the arriving mobile node, some protocol, such as SIP (Session Initiation Protocol), can be used. The handoff event can be generated through a modification in the mobile IP stack of the mobile node, in which the new access router identifier (obtained through e.g. Router Solicitation message) is delivered either directly to the application server or to the application layer in the mobile node (if handoff event delivery is implemented on the application layer). It should be noted that the handoff trigger and/or the capability information could be provided to the application server by the access router or in some other manner.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising:
receiving, in a server element, access router information relating to one or more access routers, wherein the one or more access routers are separate from the server element, and wherein the access router information comprises geographical information relating to the one or more access routers and mapping information comprising a mapping of link layer identifiers of access points to internet protocol addresses of the one or more access routers;
receiving, in the server element, information identifying an access router serving a mobile node and reachability information including a link layer identifier of a target access point that is within reach of the mobile node for internet protocol handover to a target access router via the target access point;

determining, in the server element, an internet protocol address of the target access router, wherein the address of the target access router is determined based on a mapping of the link layer identifier of the target access point to the internet protocol address of the target access router;

causing transmission of the determined internet protocol address of the target access router from the server element to the mobile node;

causing application context information of the mobile node to be registered at the server element prior to changing the serving access router of the mobile node; and using the context information in the server element to invoke application specific actions during the handover of the mobile node.

2. The method of claim 1, wherein the information identifying the access router serving the mobile node comprises an internet protocol address of the access router.

3. The method of claim 1, wherein the address comprises an internet protocol address.

4. The method of claim 1, wherein the reachability information comprises link layer identifiers relating to said one or more access routers within reach to the mobile node.

5. The method of claim 1, wherein the information identifying the access router serving the mobile node is provided by the mobile node.

6. The method of claim 1, wherein the reachability information about one or more access routers within reach to the mobile node is provided by the mobile node.

7. The method of claim 1, wherein the information identifying the access router serving the mobile node and the reachability information about one or more access routers within reach to the mobile node are provided by the access router serving the mobile node.

8. The method of claim 1, wherein causing transmission of the determined at least one address includes causing transmission of the determined at least one address of said one or more access routers within reach to the mobile node from the server element to the mobile node; and wherein the method further comprises using the at least one address in the mobile node to obtain capability information of said one or more access routers within reach to the mobile node.

9. The method of claim 1, wherein causing transmission of the determined at least one address includes causing transmission of the determined at least one address and capability information of said one or more access routers within reach to the mobile node from the server element to the mobile node.

10. The method of claim 1, further comprising:

receiving in the server element information about capabilities of interest from the mobile node; and causing transmission of the determined at least one address and capability information about capabilities of interest of said one or more access routers within reach to the mobile node from the server element to the mobile node.

11. The method of claim 1, further comprising:

receiving in the server element information about capability requirements from the mobile node; and causing transmission of the determined at least one address of one or more access routers within reach to the mobile node having capabilities matching the capability requirements from the server element to the mobile node.

12. The method of claim 1 further comprising receiving the reachability information, the reachability information relating to access routers controlled by at least two network operators, and wherein the server element is not controlled by either of the two network operators.

13. The method of claim 12, wherein the access router information comprises capability information.

14. The method of claim 1, wherein the access router information is received by the server element in the form of information relating to the previous and new access router from the mobile node when the mobile node moves from the coverage area of one access router to the coverage area of another access router.

15. The method of claim 1, wherein the access router information is received by the server element from one or more access routers.

16. The method of claim 1, further comprising:

receiving by the server element, capability information about capabilities of one or more access routers from the mobile node.

17. The method of claim 1, further comprising:

receiving in the server element capability information about capabilities of an access router from the access router.

18. The method of claim 17, wherein the server element receives capability information from the access router in response to a query from the server element.

19. The method of claim 17, wherein the capability information is received at predetermined intervals.

20. The method of claim 17, wherein the capability information is received if it changes.

21. A system, comprising:

a mobile node;

a plurality of access routers providing access for mobile nodes to an internet protocol network; and a server element, which is separate from the access routers and the mobile node, comprising access router information relating to one or more access routers, wherein the access router information comprises geographical information relating to the one or more access routers and mapping information comprising a mapping of link layer identifiers of access points to internet protocol addresses of the one or more access routers;

wherein the system is configured to provide the server element with information identifying an access router serving the mobile node and reachability information including a link layer identifier of a target access point that is within reach to the mobile node for internet protocol handover to a target access router via the target access point; and wherein the server element is configured to:

determine an internet protocol address of the target access router, wherein the address of the target access router is determined based on a mapping of the link layer identifier of the target access point to the internet protocol address of the target access router, cause transmission of the determined internet protocol address of the target access router from the server element to the mobile node, cause application context information of the mobile node to be registered at the server element prior to changing the serving access router of the mobile node; and use the context information in the server element to invoke application specific actions during the handover of the mobile node.

22. The system of claim 21, wherein the information identifying the access router serving the mobile node comprises an internet protocol address of the access router.

23. The system of claim 21, wherein the address comprises an internet protocol address.

24. The system of claim 21, wherein the reachability information comprises link layer identifiers relating to said one or more access routers within reach to the mobile node.

25. The system of claim 21, wherein the mobile node is configured to provide the information identifying the access router serving the mobile node.

26. The system of claim 21, wherein the mobile node is configured to provide the reachability information about said one or more access routers within reach to the mobile node.

27. The system of claim 21, wherein the access router serving the mobile node is configured to provide the information identifying the access router serving the mobile node and the reachability information about said one or more access routers within reach to the mobile node.

28. The system of claim 21, wherein
the server element configured to cause transmission of the determined at least one address includes being configured to cause transmission of the determined at least one address of said one or more access routers within reach to the mobile node to the mobile node; and
wherein the mobile node is configured to use the at least one address to obtain capability information on said one or more access routers within reach to the mobile node.

29. The system of claim 21, wherein
the server element configured to cause transmission of the determined at least one address includes being configured to cause transmission of the determined at least one address and capability information of said one or more access routers within reach to the mobile node to the mobile node.

30. The system of claim 21, wherein
the mobile node is configured to transmit information about capabilities of interest to the server element; and
the server element is configured to transmit the determined at least one address and capability information about capabilities of interest of said one or more access routers within reach to the mobile node to the mobile node.

31. The system of claim 21, wherein
the mobile node is configured to transmit information about capability requirements to the server element; and
the server element is configured to transmit the determined at least one address of one or more access routers within reach to the mobile node having capabilities matching the capability requirements to the mobile node.

32. The system of claim 21, wherein the reachability information relates to access routers controlled by at least two network operators, and wherein the server element is not controlled by either of the two network operators.

33. The system of claim 32, wherein the access router information comprises capability information.

34. The system of claim 21, wherein the mobile node is configured to send information relating to the previous and new access router to the server element when the mobile node moves from the coverage area of one access router to the coverage area of another access router thus providing the access router information to the server element.

35. The system of claim 21, wherein at least one access router is configured to provide the access router information to the server element.

36. The system of claim 21, wherein the mobile node is configured to transmit capability information about capabilities of one or more access routers to the server element.

37. The system of claim 21, wherein at least one access router is configured to transmit capability information about capabilities of the access router to the server element.

38. The system of claim 37, wherein the at least one access router is configured to transmit the capability information in response to a query from the server element.

39. The system of claim 37, wherein the capability information is transmitted at predetermined intervals.

40. The system of claim 37, wherein the access router is configured to transmit the capability information if it changes.

41. An apparatus comprising at least one processor and at least one memory including computer program code, the at least one memory and the computer program code configured to, with the at least one processor, direct the apparatus at least to:
receive access router information relating to one or more access routers, wherein the access router information comprises geographical information relating to the one or more access routers and mapping information comprising a mapping of link layer identifiers of access points to internet protocol addresses of the one or more access routers;
receive information identifying an access router serving a mobile node and reachability information including a link layer identifier of a target access point that is within reach to the mobile node for internet protocol handover to a target access router via the target access point;
determine an internet protocol address of the target access router, wherein the address of the target access router is determined based on a mapping of the link layer identifier of the target access point to the internet protocol address of the target access router;
cause transmission of the determined internet protocol address of the target access router from the server element to the mobile node;
cause application context information of the mobile node to be registered at the server element prior to changing the serving access router of the mobile node; and
use the context information in the server element to invoke application specific actions during the handover of the mobile node;
wherein the apparatus is configured to be separate from the access routers and the mobile node.

42. The apparatus of claim 41, wherein the information identifying the access router serving the mobile node comprises an internet protocol address of the access router.

43. The apparatus of claim 41, wherein the address comprises an internet protocol address.

44. The apparatus of claim 41, wherein the reachability information comprises link layer identifiers relating to said one or more access routers within reach to the mobile node.

45. The apparatus of claim 41, wherein the apparatus is directed to receive the information identifying the access router serving the mobile node from the mobile node.

46. The apparatus of claim 41, wherein the apparatus is directed to receive the reachability information about said one or more access routers within reach to the mobile node from the mobile node.

47. The apparatus of claim 41, wherein the apparatus is directed to receive the information identifying the access router serving the mobile node and the reachability information about said one or more access routers within reach to the mobile node from the access router serving the mobile node.

48. The apparatus of claim 41, wherein the apparatus directed to cause transmission of the determined at least one address includes being directed to cause transmission of the determined at least one address of said one or more access routers within reach to the mobile node to the mobile node.

49. The apparatus of claim 41, wherein the apparatus is directed to cause transmission of the determined at least one address includes being directed to cause transmission of the determined at least one address and capability information on said one or more access routers within reach to the mobile node to the mobile node.

50. The apparatus of claim 41, wherein the apparatus is directed to
receive information about capabilities of interest from the mobile node; and
cause transmission of the determined at least one address and capability information about capabilities of interest of said one or more access routers within reach to the mobile node to the mobile node.

51. The apparatus of claim 41, wherein the apparatus is directed to
receive information about capability requirements from the mobile node; and
cause transmission of the determined at least one address of one or more access routers within reach to the mobile node having capabilities matching the capability requirements to the mobile node.

52. The apparatus of claim 41, wherein the apparatus is directed to receive the reachability information, the reachability information relating to access routers controlled by at least two network operators, and wherein the server element is not controlled by either of the two network operators.

53. The apparatus of claim 52, wherein the access router information comprises capability information.

54. The apparatus of claim 41, wherein the apparatus is directed to
receive information relating to the previous and new access router to the apparatus from the mobile node when the mobile node moves from the coverage area of one access router to the coverage area of another access router; and
cause storage of the received information.

55. The apparatus of claim 41, wherein the apparatus is directed to receive the access router information from one or more access routers.

56. The apparatus of claim 41, wherein the apparatus is directed to receive capability information about capabilities of one or more access routers from one or more mobile nodes.

57. The apparatus of claim 41, wherein the apparatus is directed to receive capability information about capabilities of the access router from one or more access routers.

58. The apparatus of claim 57, wherein the apparatus is directed to cause a capability information query to be sent to the access router.

59. The apparatus of claim 41, wherein the apparatus is an application server.

60. A non-transitory computer-readable medium embodying a computer program, the computer program being configured to control a processor to perform:
receiving in a server element, access router information relating to one or more access routers, wherein the one or more access routers are separate from the server element and wherein the access router information comprises geographical information relating to the one or more access routers and mapping information comprising a mapping of link layer identifiers of access points to internet protocol addresses of the one or more access routers;
receiving in the server element information identifying an access router serving a mobile node and reachability information including a link layer identifier of a target access point that is within reach to the mobile node for internet protocol handover to a target access router via the target access point;
determining in the server element an internet protocol address of the target access router, wherein the address of the target access router is determined based on a mapping of the link layer identifier of the target access point to the internet protocol address of the target access router;
causing transmission of the determined internet protocol address of the target access routers from the server element router to the mobile node;
causing application context information of the mobile node to be registered at the server element prior to changing the serving access router of the mobile node; and
using the context information in the server element to invoke application specific actions during the handover of the mobile node.

* * * * *